Patented Jan. 26, 1954

2,667,493

UNITED STATES PATENT OFFICE 2,667,493

BIS-QUATERNARY SALTS AND PROCESSES FOR THEIR PREPARATION

Ronald Slack, Dennis David Libman, and David Lord Pain, Dagenham, England, assignors to May & Baker Limited, Dagenham, England, a British company No Drawing. Application November 30, 1951, Serial No. 259,317

Claims priority, application Great Britain December 15, 1950

7 Claims. (Cl. 260—313)

This invention relates to improvements in bis-quaternary salts and to processes for their preparation.

It is the object of the present invention to provide a new series of bis-quaternary salts which have useful pharmacological properties and find application, for example, as ganglionic blocking agents.

The new quaternary salts of the present invention are those which contain the cation:

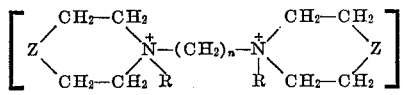

where Z represents either an oxygen atom or a single bond and R represents either a methyl or an ethyl group and $n$ represents either 5 or 6.

The properties of the alkylene-bis-N-(N-alkyl-pyrrolidinium) salts of the present invention render these compounds of especial interest as sympathetic ganglionic blocking agents. The individual pyrrolidinium compounds of outstanding interest are:

Hexamethylene-bis - N - (N - methylpyrrolidinium) salts e. g. the dibromide.
Pentamethylene-bis - N - (N - methylpyrrolidinium) salts e. g. the di-iodide.

The corresponding morpholinium compounds have the specific advantage of relatively low toxicity. The individual morpholinium compounds of outstanding interest are:

Hexamethylene-bis - N - (N - methylmorpholinium) salts e. g. the di-iodide.
Pentamethylene-bis-N - (N - methylmorpholinium) salts e. g. the di-iodide.

It will be appreciated that the nature of the anion of the salts of the present invention is not critical from the therapeutic standpoint; obviously anions which are pharmacologically undesirable should be avoided. Examples of suitable salts are the bromide, chloride, iodide, bitartrate, citrate and neutral sulphate.

The compounds of the present invention may be prepared by the application of any of the general methods heretofore known for the production of bis-quaternary ammonium salts all of which, when so applied, can be regarded as residing in the interaction of a compound of the type:

$$X—(CH_2)_n—X$$

and a compound Y, such that X represents an N-pyrrolidino or N-morpholino group or the acid residue of a reactive ester and when X represents the pyrrolidino or morpholino group Y represents a reactive ethyl or methyl ester and when X represents the acid residue of a reactive ester e. g. a halogen atom Y represents an N-methyl (or -ethyl) -pyrrolidine or -morpholine followed by, if the anion of the salt formed is not that required in the final product, conversion of the salt so formed into the required salt e. g. by metathesis or through the hydroxide.

In the case of those quaternary ammonium salts of which the anion corresponds to the acid radical of a reactive ester (such, for example, as the halides and $p$-toluene sulphonates) it is preferred, in practice, to adopt either of the following processes:

(a) Forming the corresponding polymethylene bis-pyrrolidines or -morpholines as by condensing a reactive polymethylene di-ester, e. g. dihalide, with pyrrolidine or morpholine, isolating the same and treating the isolated base with a reactive ethyl or methyl ester, such as ethyl or methyl chloride, bromide, iodide or sulphate;

(b) Condensing a corresponding reactive polymethylene di-ester, e. g. dihalide, with an N-methyl (or -ethyl) -pyrrolidine or -morpholine.

As already indicated, salts not directly obtainable by either of the two aforesaid processes e. g. the sulphates, tartrates, citrates and phosphates can be formed from the salts so obtainable either by direct metathesis or through the hydroxide. A particularly convenient method for producing water-soluble salts of this type containing the hexamethylene radical (and which can also be applied as a method for isolating water-soluble hexamethylene salts produced by direct quaternation) consists in treating an aqueous solution containing the required cation (and obtained by means of one of the aforesaid processes) with a water-soluble salt of 2:2 - dihydroxy - 1:1 - dinaphthylmethane - 3:3-dicarboxylic acid (which acid—also called embonic acid—is practically insoluble in water even at boiling point), whereby the embonate containing the said cation is precipitated. This embonate will form an aqueous solution of reasonable concentration at elevated temperature and on treating a hot solution thereof with an acid corresponding to the required salt, embonic acid is precipitated leaving the required salt in solution in a substantially pure state.

The present invention is illustrated by the following examples:

*Example I*

1.0 g. of 1:6-dimorpholinohexane in 5 ccs. of alcohol is treated with 5.0 g. of methyl iodide and the mixture warmed gently for a short time. The resulting product is recrystallised from methanol to give hexamethylene bis-N-(N-methylmorpholinium) di-iodide, M. P. 212–15° C.

*Example II*

1.0 g. of 1:6-dimorpholinohexane is dissolved in 5 ccs. of ethyl iodide and the solution refluxed on the steam bath for 1½ hours. The resulting solid is recrystallised from methanol to give hexamethylene bis-N - (N - ethylmorpholinium) di-iodide, M. P. 249° C. (decomp.).

The 1:6-dimorpholinohexane used in Examples I and II is obtained in the following manner:

24 g. of 1:6-dibromo-n-hexane is added to a solution of 102 g. of morpholine in dry benzene and the mixture is heated under reflux for 16 hours. After pouring into dilute hydrochloric acid, the aqueous liquors are separated, shaken with benzene (the benzene extracts being discarded) and made alkaline with strong caustic soda solution. The crude product is extracted with ether, washed with water and the solution dried and evaporated. Distillation of the residue gives pure 1:6-dimorpholino-n-hexane, B. P. 190° C./11 mm., M. P. 41° C.

*Example III*

2.5 g. of N-methylpyrrolidine in 10 cc. of absolute alcohol is heated at 100° C. for 4 hours with 2.6 g. of 1:6-dibromohexane. The solid which separates on cooling is filtered and recrystallised from n-butanol to give hexamethylene-bis-N-(N-methylpyrrolidinium) dibromide, M. P. 227–230° C.

*Example IV*

2.5 g. of N-methylpyrrolidine were heated with 2.3 g. of 1:5-dibromopentane and 3.0 g. of sodium iodide in 10 cc. of acetone at 100° C. in a sealed tube for 16 hours. The resulting solid was extracted with hot dry alcohol, the filtrate depositing pentamethylene-bis-N-(N-methylpyrrolidinium) di-iodide on cooling, M. P. 292° C.

*Example V*

37 g. of N-methylpyrrolidine, 23.7 cc. of 1:6-dibromohexane and 45 g. of sodium iodide in 150 ml. of acetone are heated in a sealed bomb at 100° C. for 16 hours. The product is filtered off and extracted with hot dry ethyl alcohol. Hexamethylene-1:6-bis-N-(N - methylpyrrolidinium) di-iodide crystallises from the extract on cooling. Recrystallised from alcohol, it has M. P. 178–179° C.

*Example VI*

260 g. of 1:4-dibromobutane are added dropwise during 1 hour to a refluxing mixture of 70 g. of 1:6-diaminohexane, 150 g. of potassium carbonate and 600 cc. of alcohol. The mixture is refluxed for a further 6 hours. The alcohol is evaporated, water is added and the mixture is thoroughly extracted with ether. The ethereal extracts are dried over magnesium sulphate; the ether is evaporated and the residue is distilled in vacuo giving 1:6-bis-N-(N-pyrrolidino)-hexane, B. Pt. 176–190° C./40 mm.

30 g. of the 1:6-bis(N-pyrrolidino)-hexane in 200 ml. acetone are added dropwise with ice-cooling and shaking to a solution of 50 ml. of methyl iodide in 400 ml. of acetone. After the exothermic reaction has moderated, the mixture is heated on the steam bath for a few minutes. After cooling, hexamethylene-1:6 - bis - N-(N-methylpyrrolidinium) di-iodide, which precipitates, is filtered off and recrystallised from alcohol, M. P. 178–179° C.

*Example VII*

10.1 g. of N-methylmorpholine and 2.5 g. of 1:5-dibromopentane in 10 ml. of alcohol are heated in a sealed tube at 100° C. for 16 hours. Pentamethylene - 1:5-bis-N-(N-methylmorpholinium) dibromide separates and is recrystallised from alcohol, M. P. 239–40° C.

*Example VIII*

9 g. of N-methylmorpholine, 7.3 g. of 1:6-dibromohexane, 9 g. of sodium iodide in 20 ml. of acetone are heated in a sealed tube at 100° C. for 16 hours. The mixture is cooled, filtered and the solid extracted with hot dry alcohol. Hexamethylene-1:6-bis-N-(N - methylmorpholinium) di-iodide separates from the extract on cooling and is recrystallised from methanol, M. P. 216–217° C.

*Example IX*

3.0 g. of N-ethylpyrrolidine and 2.4 g. of 1:6-dibromohexane in 10 ml. alcohol are heated in a sealed tube at 100° C. for 16 hours. Hexamethylene-1:6-bis-N-(N-ethylpyrrolidinium) dibromide is precipitated with ether and recrystallised from sec-butanol, M. P. 287° C.

*Example X*

2.5 g. of hexamethylene-1:6-bis-N-(N-methylpyrrolidinium) dibromide is dissolved in hot water and the solution added slowly to a boiling solution of the sodium salt of embonic acid (prepared from 4.62 g. of free acid). The sparingly soluble embonate thus precipitated is collected, washed in the usual manner and recrystallised from methanol-ether to give yellow needles, M. P. 215–218° C.

2.6 g. of the said embonate are dissolved in 200 ccs. of boiling water and a hot aqueous solution of 0.76 g. of tartaric acid is then slowly added thereto. After slow cooling, free embonic acid precipitated is removed and the filtrate evaporated to dryness in vacuo. The residue is recrystallised from methanol-ether to give the pure hexamethylene-1:6-bis-N- (N - methylpyrrolidinium) bitartrate, M. P. 195–196° C.

We claim:

1. Quaternary ammonium salts which contain the cation:

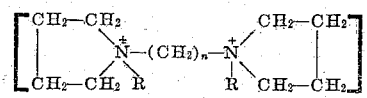

where R represents a member of the class consisting of methyl and ethyl and $n$ is at least 5 and not greater than 6.

2. Hexamethylene-bis-N-(N-methylpyrrolidinium) salts.

3. Hexamethylene-bis-N-(N-methylpyrrolidinium) dibromide.
4. Hexamethylene-bis-N-(N-methylpyrrolidinium) bitartrate.
5. Pentamethylene-bis-N-(N-methylpyrrolidinium) salts.
6. Pentamethylene-bis-N-(N-methylpyrrolidinium) bitartrate di-iodide.
7. Polymethylene-bis-N-(N-methylprrolidinium) salts in which the polymethylene bridge is a straight chain alkylene group containing at least 5 and not more than 6 carbon atoms.

RONALD SLACK.
DENNIS DAVID LIBMAN.
DAVID LORD PAIN.

References Cited in the file of this patent

Niederl: "J. Amer. Chem. Soc.," May 1944, vol. 66, pp. 840–1.